United States Patent Office  3,464,945
Patented Sept. 2, 1969

3,464,945
POLYDIORGANOSILOXANE CONTAINING SILICA FILLER AND STRUCTURE CONTROL AGENT
Arthur C. Martellock, Schenectady, N.Y., assignor to General Electric Company, a corporation of New York
No Drawing. Filed Nov. 10, 1966, Ser. No. 593,290
Int. Cl. C08g 47/06, 51/04
U.S. Cl. 260—29.1        10 Claims

ABSTRACT OF THE DISCLOSURE

A silicone rubber compound of improved structure and crepe-aging characteristics comprising (A) a polydiorganosiloxane convertible to the solid, cured, elastic state and having the formula:

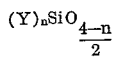

(B) a structure-inducing reinforcing silica filler, and (C) from 1 to 10 parts by weight, based on the weight of said polydiorganosiloxane, of a structure control additive having the formula:

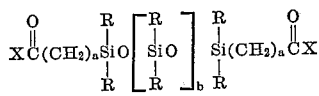

where R is a member selected from the class consisting of methyl and phenyl, provided that at least 50% of the R groups are methyl, X is a member selected from the class consisting of —OH, —NH$_2$, and —OR', R' is a member selected from the class consisting of methyl and ethyl, Y is a member selected from the class consisting of monovalent hydrocarbon radicals and halogenated monovalent hydrocarbon radicals, $a$ is a whole number equal to from 2 to 4, inclusive, $b$ has a value of from 0 to 10, inclusive, and $n$ has a value of from 1.98 to 2.01, inclusive.

---

This invention relates to new silicone rubber compositions. In particular, this invention relates to silicone rubber compositions which are convertible to the solid, cured, elastic state and which exhibit improved structure and knit-time properties.

In the manufacture of silicone rubber articles, an organopolysiloxane convertible to the solid, cured, elastic state is first manufactured. This convertible organopolysiloxane is then mixed with a suitable filler which serves both to extend the convertible organopolysiloxane and to improve the physical properties of the final manufactured silicone rubber article. The mixture of organopolysiloxane and filler, as well as other ingredients, such as coloring agents and vulcanizing agents, is known as a silicone rubber compound. After preparation of these silicone rubber compounds, they are often stored for a considerable period of time from the time of mixing to the time when they are converted to a silicone rubber article. The silicone rubber articles are prepared by first "freshening" the silicone rubber compound, adding a vulcanizing agent if necessary, molding or extruding the silicone rubber compound into the desired shape, and then curing the shaped silicone rubber compound to form a cured silicone rubber article.

The most common and useful fillers for the silicone rubber compounds are finely divided reinforcing silica fillers. While these fillers permit the production of cured silicone rubber articles of excellent physical properties, these fillers cause structuring or crepe-aging of the silicone rubber compounds so that during the time interval of days or months between the manufacture of the silicone rubber compound and the time at which the compound is freshened, the compound becomes very difficult to work. When the compound is placed on a rubber mill for freshening, it is found that an excessive time is required to form a smooth, continuous sheet which can be used in the final shaping operation. The time required to form such a smooth, continuous sheet is known as "knit-time." With some highly reinforcing silica fillers, this structure problem has been so severe that it has been impossible to mill the filled compositions and form the continuous sheet necessary for the subsequent forming operation. This problem has been recognized in the art and a number of solutions have been proposed. While these various solutions have been successful to some degree, it has been found that none of the prior art materials proposed for addition to organopolysiloxanes has been completely satisfactory in solving the structure problem.

One of the most useful additives for reducing the structure or crepe-aging of silicone rubber compounds has been diphenylsilanediol. While this material has produced very satisfactory results and is used in a number of commercial applications, the diphenylsilanediol has still failed to reduce structure and knit-time to the extent desired.

The present invention is based on the discovery that the structure and knit-time of conventional silicone rubber compounds can be significantly reduced by incorporating into the organopolysiloxanes a specific class of low molecular weight organopolysiloxanes having the formula:

(1)   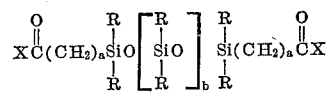

where R is a member selected from the class consisting of methyl or mixtures of methyl and phenyl having at least 50% methyl groups, X is a member selected from the class consisting of —OH, —NH$_2$, or —OR', where R' is methyl or ethyl; $a$ has a value of from 2 to 4, inclusive, and $b$ is a whole number equal to from 0 to 10, inclusive. Organopolysiloxanes having incorporated therein from 1 to 10 percent and preferably from 2 to 7 percent by weight, based on the weight of the convertible organopolysiloxane in the silicone rubber compound exhibit markedly lower knit-times than compositions containing either diphenylsilanediol or compositions which do not have any additive for preventing unduly high structure and knit-time.

The compositions within the scope of Formula 1 are generally known in the art and comprise, preferably, disiloxanes in which each silicon atom contains two silicon-bonded methyl groups and one carboxyalkyl radical, carbalkoxyalkyl radical or amidoalkyl radical where the akyl portion of the radical contains from 2 to 4 carbon atoms. The compositions within the scope of Formula 1 are relatively simple to prepare. For example, the compositions within the scope of Formula 1, where X is hydroxyl and R is methyl, are shown in Patent 2,589,446—Sommer. Compositions within the scope of Formula 1, where $b$ is greater than 0, can be prepared by the acid equilibration of compounds within the scope of Formula 1 where $b$ is equal to 0 with a cyclic polydiorganosiloxane. Particularly useful polydiorganosiloxanes are cyclotetrasiloxanes, such as octamethylcyclotetrasiloxane and sym-tetramethyltetraphenylcyclotetrasiloxane.

In order to control the particular member of the series of compositions within the scope of Formula 1, where $b$ is equal to more than 0, the proportions of the disiloxane of Formula 1 and the cyclic polydiorganosiloxane are selected in the proper stoichiometric ratios. For example, to prepare a composition within the scope of Formula 1 in which $b$ is equal to 2, the reaction mixture would involve ingredients in the ratio of 2 moles of the disiloxane in which $b$ is equal to 0 and one mole of a cyclotetrasiloxane. The amount of sulfuric acid employed in the reaction mixture is known in the art for equilibration reactions and perfectly satisfactory equilibration reactions are obtained when the amount of siloxane is equal to about 5 to 10 percent by weight of the equilibration reaction mixture.

A convenient method of preparing compositions within the scope of Formula 1 in which X is an amine group is by the hydrochloric acid hydrolysis of the corresponding cyanoalkyl compound containing the same number of carbon atoms. Compositions within the scope of Formula 1 in which X is an OR' group are prepared by merely reacting a carboxyalkylpolysiloxane within the scope of Formula 1 with either methanol or ethanol, employing stoichiometric amounts of the alcohol and a catalytic amount of a suitable esterification catalyst, such as p-toluene sulfonic acid. The reaction product is then isoated from the reaction mixture.

The convertible organopolysiloxanes with which the present invention is concerned, are organopolysiloxanes convertible by means known in the art to the cured, solid, elastic state. These organopolysiloxanes are generally benzene-soluble materials which vary in viscosity from viscous masses to gummy solids, depending upon the nature and state of condensation of the starting organopolysiloxanes. In general, these materials have viscosities in the range of from about 10,000 centistokes at 25° C. up to ten to twenty million centistokes or more. In general, these compositions contain an average of from 1.98 to 2.01 organic groups per silicon atom and, preferably, are polydiorganosiloxanes containing an average of 2 silicon-bonded organic groups per silicon atom, with the organic groups being attached to silicon atoms through a silicon-carbon linkage.

These organopolysiloxanes can be described by the formula:

(2) 

where Y is a member selected from the class consisting of monovalent hydrocarbon radicals and halogenated monovalent hydrocarbon radicals and $n$ has a value of from about 1.98 to 2.01, preferably having a value of 2.0. Illustrative of the groups represented by Y in Formula 2 are monovalent hydrocarbon groups, such as, for example, alkyl radicals, e.g., methyl, ethyl, propyl, octyl, octadecyl, etc. radicals; aryl radicals, e.g., phenyl, tolyl, xylyl, etc. radicals; aralkyl radicals, e.g., benzyl, phenylethyl, etc radicals; cycloalkyl and cycloalkenyl radicals, e.g., cyclohexyl, cycloheptyl, cyclohexenyl, etc. radicals; alkenyl radicals, e.g., vinyl, allyl, etc. radicals; as well as various chlorinated hydrocarbon radicals, such as, for example, chloromethyl, chlorophenyl, dibromophenyl, trifluoromethylethyl, etc. radicals. Preferably, at least 50% of the organic groups represented by Y in Formula 2 are methyl radicals.

Included within the scope of Formula 2 are polydiorganosiloxanes which can be termed copolymers containing two or more different diorganosiloxane units therein, such as copolymers of dimethylsiloxane units and methylphenylsiloxane units; or copolymers of methylphenylsiloxane units, diphenylsiloxane units, dimethylsiloxane units and methylvinylsiloxane units; as well as copolymers of dimethylsiloxane units, methylvinylsiloxane units, and diphenylsiloxane units.

While a number of convertible organopolysiloxanes have been described in the foregoing discussion, it should be understood that the convertible organopolysiloxanes with which the present invention are concerned are well known in the art and descriptions of such materials can be found in Patents 2,448,756—Agens, 2,448,556—Sprung et al., 2,484,595—Sprung, 2,457,688—Krieble et al., 2,521,528—Marsden, 2,490,357—Hyde, 2,541,137—Warrick, and 2,890,188—Konkle et al.

The reinforcing silica fillers with which the present invention is concerned can be described as finely divided silica fillers having a surface area of at least 50 e.g., from 50 to 500 square meters per gram. These fillers are well known in the art and a number of such fillers are described in Patents 2,541,137, 2,610,167, and 2,657,149. Included within this group of finely divided silica fillers are the commercial silica fillers, such as fume silicas, precipitated silicas, and silica aerogels.

The organopolysiloxane compositions of reduced structure and knit-time with which the present invention is concerned are prepared by merely mixing together in any suitable fashion the aforementioned organopolysiloxane convertible to the solid, cured, elastic state, the aforementioned structure-inducing silica fillers, and the structure control additives of Formula 1. While the proportions of the various ingredients can vary within extremely wide ranges, the organopolysiloxanes of reduced structure and knit-time of the present invention preferably comprise, on a weight basis, (A) 100 parts of the convertible organopolysiloxane of Formula 2, (B) from 10 to 200 parts, and preferably from 20 to 60 parts, of the structure-inducing silica filler, and (C) from about 1 to 10 parts, and preferably from 2 to 7 parts, of the structure control additive of Formula 1.

While the organopolysiloxanes of reduced structure and knit-time of the present invention can be prepared in a number of ways, it is preferred that the structure control additive of Formula 1 be incorporated into the composition at a time no later than the incorporation of the structure-inducing silica filler into the composition. For example, the structure-control additive of Formula 1 and the convertible organopolysiloxane of Formula 2 can be mixed together and the desired amount of the structure-inducing silica filler thereafter added. Most conveniently, this mixing is effected on differential milling rolls or in a doughmixer. Alternatively, the convertible organopolysiloxane of Formula 2, the structure-inducing silica filler, and the structure control additive of Formula 1 can be mixed together on rubber mills or in a doughmixer.

The precise method of mixing the compositions on a doughmixer or on rubber mills depends on the nature of the particular components of the reaction mixture. For example, when the structure control additive of Formula 1 is a solid material, it is more convenient to mix the components of the composition at an elevated temperature, e.g., a temperature above the melting point of the additive of Formula 1. Generally, mixing temperatures of the order of 90 to 120° C. have been found to very useful for accomplishing uniform mixing. Alternatively, when the additive is a liquid material, the mixing can be effected at room temperature, e.g., a temperature of about 20 to 25° C. Generally speaking, the structure control additives within the scope of Formula 1 which are solids at room temperature are those materials in which X is hydroxyl or amino and $b$ is equal to 0. All of the compounds within the scope of Formula 1 other than this are generally liquids at room temperature.

After mixing the components of applicant's silicone rubber compound together, it is found that the resulting mixed product can stand for extended periods of time and, because structure formation is held to a minimum, the compound can be readily "freshened" by a very brief milling. After freshening, the compound is ready for formation into the desired shape by molding or extrusion, with subsequent curing to convert the organopolysiloxane to the solid, elastic, cured state.

This curing can be effected by chemical vulcanizing agents or by high energy electron irradiation. Most often, chemical vulcanizing agents are employed for the curing operation and any of the conventional curing agents can be employed. In general, these curing agents are free radical catalysts, such as organic peroxides, including, for example, benzoyl peroxide, tertiarybutylperbenzoate, bis-(dichlorobenzoyl)peroxide, bis-(alpha-cumyl)peroxide, and the like.

The time required for the curing of the silicone rubber compounds varies from several minutes to several hours, depending upon the particular curing catalyst employed and the amount employed. In general, such catalysts are present in an amount ranging from about 0.1 to 10 percent by weight, based on the weight of the convertible organopolysiloxane of Formula 2. The curing agent can be incorporated into the organopolysiloxane compound during the mixing operation so long as the temperature of the compound during the addition of the curing agent is below the activation temperature of the peroxide. Alternatively, the catalyst can be added during the freshening operation prior to the curing of the organopolysiloxane.

While the above description has identified the types of structure-inducing silica fillers which are employed in the preparation of the organopolysiloxane compositions of reduced structure and knit-time, it should be understood that mixtures of more than one type of structure-inducing filler can be employed. In addition, these compositions can contain both a structure-inducing reinforcing silica filler, as well as other types of fillers which are usually non-reinforcing and non-structure-inducing, such as titanium dioxide, lithopone, calcium carbonate, iron oxide, carbon black, and the like.

In order that those skilled in the art may better understand the practice of the present invention, the following examples are given by way of illustration and not by way of limitation. All parts are by weight.

In determining the structure or crepe-aging of the silicone rubber compounds of the present invention, the knit-times of such compositions were measured. Knit-time was determined on a silicone rubber compound which had been allowed to stand at room temperature for 7, 14, or 28 days after it had been first mixed. In the test, a two-roll differential mill, three inches by eight inches, was employed in which the speed ratio between the two rolls was 1.4 to 1, and the faster roll revolved at a speed of about 60 r.p.m. The mill roll clearance was adjusted to pass a 12 mil thick soft solder slug at a temperature of around 70 to 90° F. In conducting the test for knit-time, 30 g. of the compound under test were added to the nip of the roll. When all of the compound had passed through the nip once, a stopwatch was triggered, and the timing begun. The compound was then added to the nip again and, in order to keep the bank of compound in motion, it was sometimes necessary to open the mill slightly for a brief interval and then return to the predetermined 12 mil adjustment. The timing was continued until the compound became plastic and completely covered the width of the faster roll in the form of a continuous solid film. As soon as this happened, the timing was stopped and this elapsed time was recorded as "knit-time."

Example 1

The convertible organopolysiloxane used in this example, which is referred to hereinafter as the "methylvinylpolysiloxane," is a dimethylvinyl chain-stopped copolymer of dimethylsiloxane units and methylvinylsiloxane units containing 0.2 mole percent silicon-bonded vinyl groups and having a viscosity of about 20,000,000 centistokes at 25° C. Silicone rubber compounds were prepared by mixing 100 parts of the methylvinylpolysiloxane, 40 parts of a finely divided fume silica filler having a surface area of about 325 square meters per gram, and 5 parts of various structure control additives, except for a control in which no additive was employed.

The 1,1,3,3-tetramethyl-1,3-bis(beta - carboxyethyl)disiloxane of this example was a white crystalline solid having a melting point of 51 to 53° C. The 1,1,3,3-tetramethyl-1,3-bis(gamma - carboxypropyl)disiloxane had a melting point of 45 to 47° C. Its infrared spectrum and neutralization equivalent were consistent with its composition. The 1,1,3,3-tetramethyl-1,3 - bis(beta - amidoethyl)disiloxane had a melting point of 87 to 90° C. and its infrared spectrum was consistent with its composition. The 1,1,3,3-tetramethyl-1,3 - bis(amidopropyl)disiloxane had a melting point of 76 to 79° C. The 1,1,3,3-tetramethyl-1,3-bis(gamma - carbomethoxypropyl)disiloxane was a liquid with a boiling point of 129° C. at 0.9 mm. and had a refractive index of $n_D^{25}$ of 1.4347. The compound 1,1,3,3-bis(gamma - carbethoxypropyl)disiloxane had a boiling point of 141° C. at 1.2 mm. and a refractive index $n_D^{25}$ of 1.4340. The identity of all of the above materials was confirmed by infrared analysis.

The mixing of the methylvinylpolysiloxane, the silica filler and the structure control additives was effected at a roll temperature of 150° C. for the carboxyalkyl and amidoalkyl additives. For the ester additives, the diphenylsilanediol, and the control room temperature milling was employed. The 5 parts of diphenylsilanediol were added as a 50% solution of diphenylsilanediol in a methylpolysiloxane fluid. After milling the components together to form the silicone rubber compounds, the compounds were aged at times of 7 days, 14 days, or 28 days, and then the knit-time at the end of this aging period was determined for each composition. After measuring the knit-time at the end of 28 days, the compounds were mixed with 1.3 parts of a 50% suspension of 2,4-dichlorobenzoylperoxide in a dimethyl silicone fluid per 100 parts of the silicone rubber compound. The resulting catalyzed compounds were press-cured at a temperature of 150° C. for 15 minutes and postcured for 24 hours at 250° C. The tensile strength, percent elongation, and hardness were determined for each cured product. In Table I which follows are listed the knit-times in seconds for each of the compositions described above after the specified number of days, the tensile strength in pounds per square inch, the percent elongation, and the Shore A hardness of the cured products.

TABLE I

| Run No. | Structure control additive | Knit-time, sec.-days | | | Tensile, p.s.i. | Elongation, percent | Hardness Shore A |
|---|---|---|---|---|---|---|---|
| | | 7 | 14 | 28 | | | |
| 1 | [(CH$_3$)$_2$(HOOC)(CH$_2$)$_2$Si]$_2$O | 5 | 2 | 4 | 690 | 160 | 76 |
| 2 | [(CH$_3$)$_2$(HOOC)(CH$_2$)$_3$Si]$_2$O | 6 | | 6 | 1,005 | 250 | 72 |
| 3 | [(CH$_3$)$_2$(H$_2$NCO)(CH$_2$)$_2$Si]$_2$O | 4 | 3 | 3 | 600 | 230 | 73 |
| 4 | [(CH$_3$)$_2$(H$_2$NCO)(CH$_2$)$_3$Si]$_2$O | 3 | | 5 | 1,036 | 260 | 71 |
| 5 | [(CH$_3$)$_2$(CH$_3$OOC)(CH$_2$)$_3$Si]$_2$O | 16 | | 26 | 1,160 | 310 | 73 |
| 6 | [(CH$_3$)$_2$(C$_2$H$_5$OOC)(CH$_2$)$_3$Si]$_2$O | 21 | | 26 | 1,160 | 270 | 74 |
| 7 | (C$_6$H$_5$)$_2$Si(OH)$_2$ | 80 | 106 | 139 | 540 | 270 | 68 |
| 8 | None | 1 2,274 | (¹) | (¹) | 790 | 220 | 70 |

¹ Unmillable.

As shown by the above table, the structure additives of the present invention provide knit-times which vary from 2 to 26 seconds after aging periods of 7, 14, and 28 days. This is compared with the knit-times of 80, 106, and 139 seconds obtained after aging of 7, 14, and 28 days, respectively, with diphenylsilanediol, a conventional structure control additive. This also compares with the unmillable material which results from the absence of any structure control additive in the composition. As also indicated by the table, the use of the additive did not have an adverse affect on the physical properties of the final cured silicone rubber and, in fact, in most cases was beneficial to these physical properties.

Example 2

This example describes the preparation and use of a composition within the scope of the present invention wherein X is a whole number within the range mentioned. In particular, to a reaction vessel was added 306 parts of 1,1,3,3 - tetramethyl - 1,3-bis(gamma-carboxypropyl)disiloxane and 444 parts of octamethylcyclotetrasiloxane. To this reaction vessel was then added 22 parts of 86% sulfuric acid and the reaction mixture was maintained at a temperature of 100° C. for 2 hours. This reaction mixture resulted in a lower aqueous phase and an upper organic phase. The aqueous phase was separated and the upper phase was washed with hot concentrated aqueous sodium sulfate four times and was then dried with dry sodium sulfate. After being thoroughly dried, the reaction mixture was filtered through diatomaceous earth to produce a composition having the average formula:

(3) 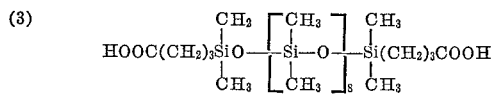

This was a clear liquid having a viscosity of 93 centistokes at 25° C. and had an acid number of 134 as compared with the theoretical value of 125. At room temperature, 100 parts of the methylvinylpolysiloxane described earlier, 40 parts of the fumed silica described earlier, and 5 parts of the carboxyethylpolysiloxane of Formula 3 were milled together at a roll temperature of 138° C. This material was allowed to sit at room temperature for 7 days at which time its modified knit-time was measured and found to be 17 seconds. When this material was compounded with 2,4-dichlorobenzoylperoxide in the manner described in Example 1, a silicone rubber of satisfactory physical properties was obtained.

Example 3

In this example, the convertible organopolysiloxane was a methylphenylpolysiloxane which contained 5.3 mole percent diphenylsiloxane units and 94.7 mole percent dimethylsiloxane units and had a viscosity in excess of 10,000,000 centistokes at 25° C. One hundred parts of this methylphenylpolysiloxane was milled with 40 parts of the finely divided silica previously mentioned and with varying amounts of the carboxyalkylsiloxane of Formula 3. To one batch of this material there was added 1 part of the carboxyalkylpolysiloxane of Formula 3 per 100 parts of the methylphenylpolysiloxane and to another batch was added 10 parts of the carboxyalkylpolysiloxane of Formula 3 per 100 parts of the methylphenylpolysiloxane. After milling these two materials at room temperature, both materials were allowed to stand at room temperature for 14 days at which time the knit-times were determined. For the material containing 1 part of additive, the knit-time was 198 seconds and for the material containing 10 parts of additive, the knit-time was 58 seconds. A control containing no additive had a knit-time of 497 seconds. These data show that both of the materials had improved knit-time. When these materials were converted to rubber by mixing them with 2 parts by weight of benzoyl peroxide per 100 parts of the methylphenylpolysiloxane, satisfactory silicone rubbers were obtained.

While the foregoing examples have illustrated many of the embodiments of my invention, it is understood that my invention is directed broadly to the combination of a silicone composition within the scope of Formula 2 which is convertible to the solid, cured, elastic state, a finely divided structure-inducing reinforcing silica filler and a structure control additive within the scope of Formula 1. This combination of materials provides a silicone rubber compound of improved structure and knit-time as compared with the silicone rubber compound which does not contain any structure control additive or which contains a structure control additive of the type described in the prior art.

What I claim as new and desire to secure by Letters Patent of the United States is:

1. A silicone rubber compound of improved structure and crepe-aging characteristics comprising (A) a polydiorganosiloxane convertible to the solid, cured, elastic state and having the formula:

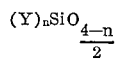

(B) a structure-inducing reinforcing silica filler, and (C) from 1 to 10 parts by weight, based on the weight of said polydiorganosiloxane, of a structure control additive having the formula:

where R is a member selected from the class consisting of methyl and phenyl, provided that at least 50% of the R groups are methyl, X is a member selected from the class consisting of —OH, —NH$_2$, and —OR', R' is a member selected from the class consisting of methyl and ethyl, Y is a member selected from the class consisting of monovalent hydrocarbon radicals and halogenated monovalent hydrocarbon radicals, $a$ is a whole number equal to from 2 to 4, inclusive, $b$ has a value of from 0 to 10, inclusive, and $n$ has a value of from 1.98 to 2.01, inclusive.

2. The composition of claim 1 in which R is methyl.
3. A composition of claim 1 in which R is methyl and $b$ is equal to 0.
4. A composition of claim 1 in which X is —OH.
5. A composition of claim 1 in which X is —NH$_2$.
6. A composition of claim 1 in which X is —OR'.
7. A composition of claim 1 in which $a$ is equal to 2.
8. A composition of claim 1 in which $a$ is equal to 3.
9. Composition of claim 6 wherein R' is methyl.
10. Composition of claim 1 in the cured state.

References Cited

UNITED STATES PATENTS

| | | | |
|---|---|---|---|
| 2,991,266 | 7/1961 | Bluestein et al. | 260—29.1 |
| 2,973,383 | 2/1961 | Black | 260—448.21 |
| 3,065,202 | 10/1962 | Bluestein | 260—448.2 |

MORRIS LIEBMAN, Primary Examiner

L. T. JACOBS, Assistant Examiner

U.S. Cl. X.R.

260—37